Aug. 1, 1961

M. PETRICK 2,994,657

CHIMNEY FOR BOILING WATER REACTOR

Filed Dec. 11, 1959

INVENTOR.
Michael Petrick
BY
Roland A. Anderson
Attorney

Aug. 1, 1961 — M. PETRICK — 2,994,657
CHIMNEY FOR BOILING WATER REACTOR
Filed Dec. 11, 1959 — 3 Sheets-Sheet 2

INVENTOR.
Michael Petrick
BY
Attorney

Aug. 1, 1961　　　　　M. PETRICK　　　　　2,994,657
CHIMNEY FOR BOILING WATER REACTOR
Filed Dec. 11, 1959　　　　　　　　　　　3 Sheets-Sheet 3

INVENTOR.
Michael Petrick
BY
Roland A. Anderson
Attorney

2,994,657
CHIMNEY FOR BOILING WATER REACTOR
Michael Petrick, Hammond, Ind., assignor to the United States of America as represented by the United States Atomic Energy Commission
Filed Dec. 11, 1959, Ser. No. 859,077
2 Claims. (Cl. 204—193.2)

The present invention relates to boiling coolant nuclear reactors and more particularly to heterogeneous boiling water nuclear reactors for the production of useful power.

The improvements in reactor design hereinafter disclosed are related mostly to natural circulation boiling systems such as disclosed in the copending application of Samuel Untermyer, S.N. 518,427, filed June 28, 1955, now Patent No. 2,936,273, issued May 10, 1960. A basic problem of reactor design is to obtain the maximum amount of power within a reactor core of specific geometry. With boiling reactors, it is desirable to generate this power with a minimum amount of steam volume in the core because large quantities of steam represent a loss in moderation and usually a loss in reactivity. Stability and burnup problems also arise due to the presence of excess void volumes causing a reduction in the permissible maximum power density.

In natural circulation boiling reactors, recirculation within the reactor vessel results from the saturated water at the top of the core flowing to the downcomer and mixing with the colder make-up water. The mixture flows down the downcomer and enters the bottom of the core wherein heat is added over the active length of the core. The steam generated in the coolant passages creates a natural circulation driving head because of the fluid density differential between the core coolant channels and the downcomer.

To improve the natural circulation pumping action, it has previously been suggested that extensions or "chimneys" be added to the upper exit end of the core coolant channels. The addition of the chimneys results in a reduction of the amount of steam volume in the core and hence an increase in the maximum power density as discussed in an article, "Dual Cycle Improves Boiling Water Reactors," by Samuel Untermyer, Nucleonics, July 1955, pp. 34–35.

It has been found, however, that the added length of the individual coolant channels increases the resistance to two-phase fluid-flow. The length of extension or chimney that may be used is thus restricted to a short optimum length at which the increased driving head has a substantially greater effect than the flow rate loss due to the added two-phase flow resistance.

It is also of great importance to the efficient operation of natural circulation boiling water reactors that the steam be disassociated from the saturated water to the greatest extent possible in the downcomer portion of the circulation system. The presence of steam bubbles in the return water reduces the density in that portion and thus slows down the natural circulation pumping action of the system. The temperature of the liquid returned to the active core of the reactor is also maintained at a lower level if the steam disassociation in the downcomer is improved resulting in greater cooling of the core and hence greater maximum power density levels.

It is therefore an object of this invention to improve the natural circulation coolant flow through a boiling coolant reactor.

It is another object of this invention to improve the natural circulation coolant flow through a boiling coolant reactor by increasing the natural circulation driving head without materially increasing the two-phase fluid flow resistance in the system.

It is another object of this invention to improve the natural circulation coolant flow through a boiling coolant reactor having a finite sized pressure vessel by increasing the steam disengagement from the water returning to the active portion of the reactor.

It is well known that nuclear reactors do not generate heat uniformly throughout the volume of their active portions. The heat distribution in a uniformly fueled and uniformly cooled core conforms substantially to the neutron flux density distribution which is essentially co-sinusoidal in a radial direction from the center of the core. In order to increase the usable power output of the reactor, it is necessary to normalize the temperature distribution throughout the reactor core to maintain the materials in the central portion below a maximum permissible level. Previously the methods used have necessitated changes in the geometery of the active portion. For example, temperatures were equalized by changing the reactivity distribution of the core which operated to flatten the flux distribution. This was accomplished by changing the fuel content or by changing the fuel to moderator ratio.

Another method utilized to equalize the temperature distribution was to increase the heat removal in the central portion of the core either by increasing the coolant flow rate or by changing the heat exchange capacity of the cooling means therein. In the above examples, it can be seen that changes in the reactor configuration were required. These add to the costs of the reactor, especially if they are rsed to increase the power output of an already existing reactor.

It is therefore a further object of this invention to provide improvements in the design of natural circulation boiling reactors wherein the rate of coolant flow through different portions of the active core may be preselected in accordance with the different heat generation rates in the separate portions without changing the geometry of the reactor active portion.

Further objects and advantages of the invention will become apparent to those skilled in the art upon further reading of the specification.

In accordance with the present invention there is provided a natural circulation boiling coolant nuclear reactor comprising an active portion having coolant channels vertically extending therethrough enclosed in a pressure vessel. Coolant surrounds the active portion within the vessel and fills the coolant channels, the bottom of the coolant channels communicating with the body of surrounding coolant. In place of the individual chimneys for each coolant channel, as hereinbefore described, a large riser is provided having a flow area equal to at least the flow area of all of the coolant channels combined. The two-phase flow resistance is thus substantially lower than individual chimneys and the riser may be made as tall as desired, dependent only on the flow rate desired and the particular geometry of the enclosing pressure vessel. To obtain maximum disassociation of the steam from the saturated water as it recirculates through the downcomer the riser is shaped to lower the coolant flow velocity at elast at its upper end. Since the exit end of the riser need only approximate the total flow area of all of the combined coolant channels, it may be tapered convergently upwardly so as to provide a maximum flow area in the downcomer region.

Large risers of the type herein described may also be used to control the flow rate through different portions of the reactor core. Different flow rates may be obtained by the use of a plurality of concentric risers designed to slow the coolant flow rate only in the outer portions of the reactor. As a result of the reduced flow in the outer portions of the reactor, the total flow in the downcomer region will also be reduced allowing a greater disassociation of steam from the returning coolant.

For a more detailed description of the invention, reference is made to the accompanying drawings which illustrate the application of the invention to the Experimental Boiling Water Reactor (EBWR) located at Argonne National Laboratory and described fully in Argonne National Laboratory Report ANL–5781 published approximately November 1957. Certain modifications to the design of the Experimental Boiling Water Reactor have been made, including the devices of this invention, to increase its operating heat output capacity from 20 megawatts to 100 megawatts. In the drawings:

FIG. 3 is an isometric view of a frame for a new fuel assembly for the Experimental Boiling Water Reactor;

FIG. 4 is a vertical partial section of a fuel rod subassembly to fit within the frame of FIG. 3;

Figure 1:
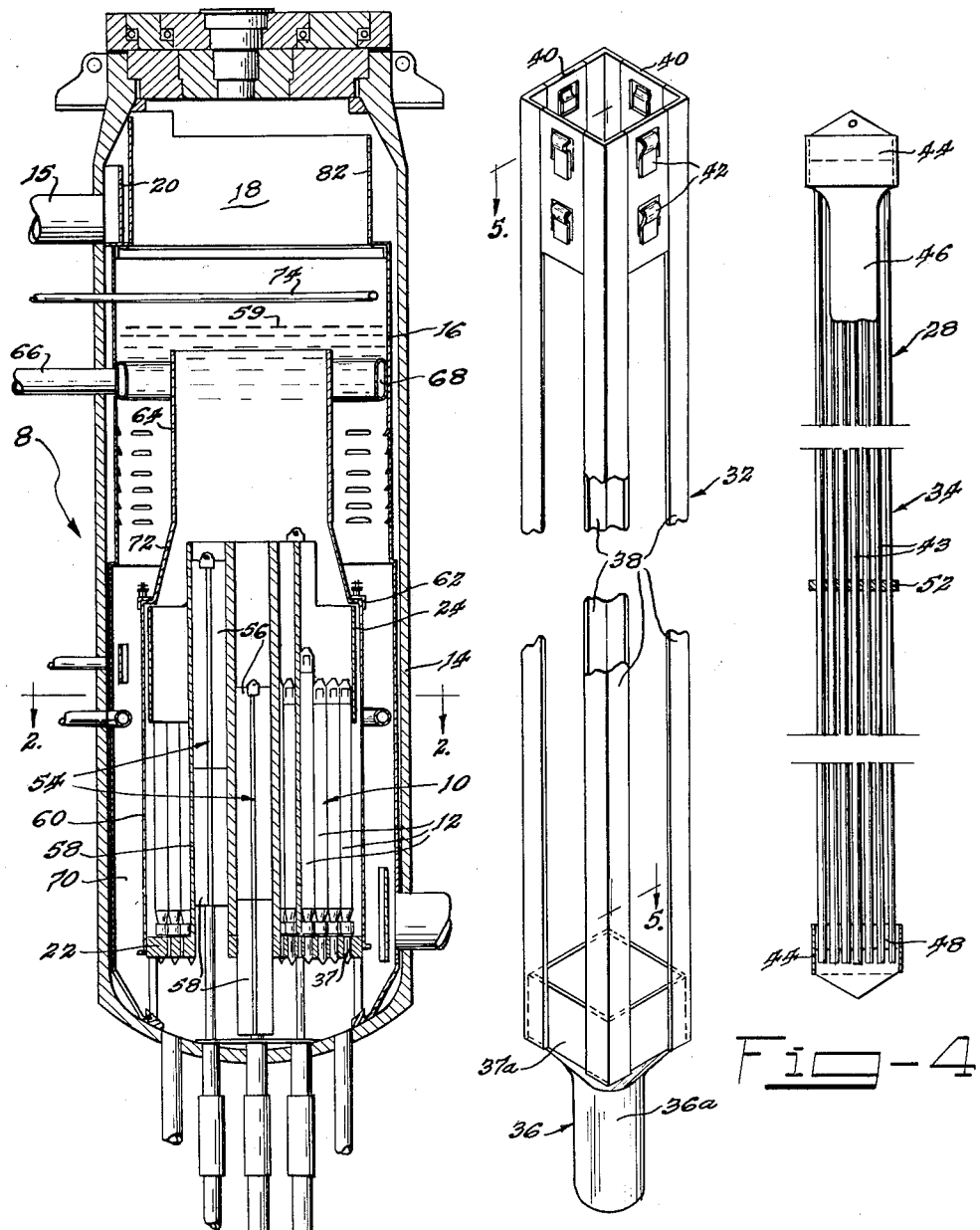
FIG. 1 is a vertical section of the Experimental Boiling Water Reactor taken along the line 1—1 of FIG. 2 showing the addition of a large diameter riser in accordance with this invention.
Figure 2:
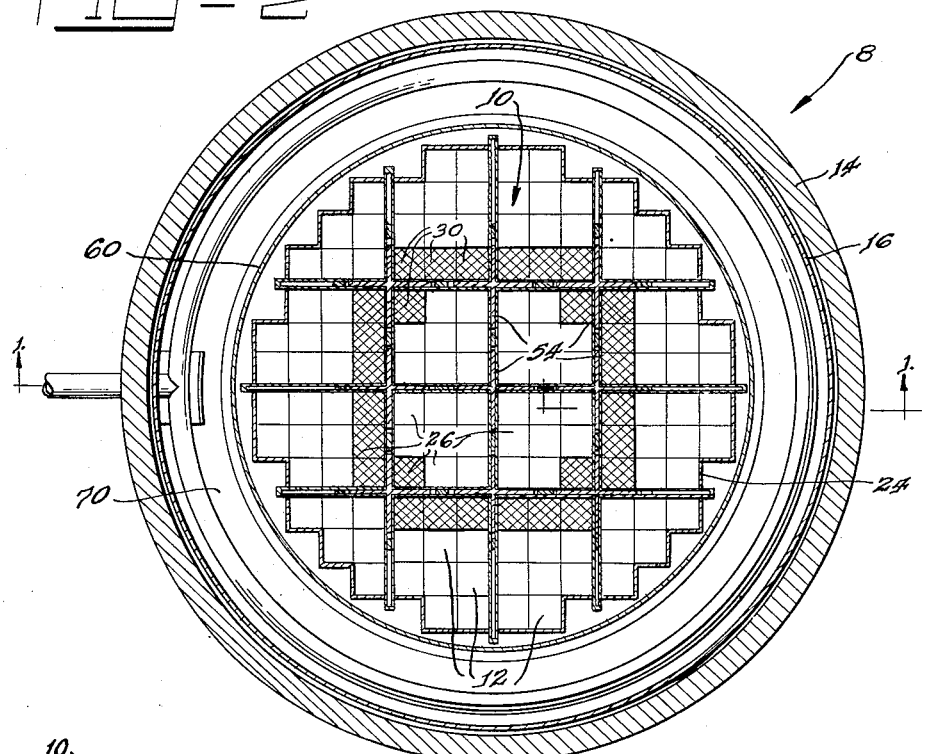
FIG. 2 is a horizontal section of the reactor taken along the line 2—2 of FIG. 1.

Reference is now made to FIGS. 1 and 2 wherein is shown a boiling water reactor 8, having an active portion 10. Said active portion comprises a plurality of fuel assemblies 12 in an arrangement approximating a right circular cylinder and is disposed concentrically within a pressure vessel 14. The pressure vessel 14 is substantially unaltered from that disclosed in the aforementioned report ANL–5781 and hence will not be described in detail. The shock-shield referenced 16 in FIG. 1 also remains substantially unaltered except for a steam baffle system 18 added at its upper end to assure steam collection by steam outlet 15 at the highest possible level in the pressure vessel 14.

The baffle 18 is a substantially cylindrical extension of the shock-shield and has a portion adjacent to the steam outlet 15 extending to the inside wall of the pressure vessel 14. An arcuate-shaped head chamber 20 provides communication between the top of the reactor vessel and the steam outlet 15. The baffle system is designed to permit operation with a high water level necessitated by the addition of the circulation riser added in accordance with this invention and described in detail hereinafter. It also provides a means for preventing large slugs of water from entering the steam system.

*Active portion*

The active portion 10 of the reactor consists of vertically extending, closely-packed fuel assemblies 12 supported at the bottom end by a lower grid plate 22 and guided at the top by a metal guide structure 24. A fuel assembly occupies each of the 4-inch square locations 26 shown in FIG. 2. The bottom grid is 5¾ inches thick, type-304 stainless steel plate installed at the bottom of the pressure vessel 14 to support the fuel assemblies 12 and fix their position. The support grid 22 and the guide structure 24 are designed to provide the necessary flexibility for thermal and elastic variations. They are both removable from the pressure vessel 14 in the event that a revised active portion arrangement is desired.

In modifying the EBWR reactor for 100 megawatt operation the reactor active portion 10 has been enlarged to a diameter of approximately 5 feet by adding additional fuel assemblies 12 around the periphery. One hundred forty-seven of the 4-inch square locations 26 are occupied by fuel assemblies 12 and one location is occupied by a dummy assembly containing a neutron source for initiating the operation of the reactor. The new EBWR loading comprises 56 four-foot long enriched fuel assemblies with heavy plates, 56 four-foot long enriched assemblies with thin plates and 7 four-foot long natural uranium assemblies with both heavy and thin plates. Each type of assembly is described in detail in the report ANL–5781 and therefore not described further here since this does not form a part of the invention.

There have been added twenty-eight new type fuel assemblies 28 which occupy the indicated locations 30 in a square arrangement as shown in FIG. 2. The new assemblies 28, hereinafter referred to as spike assemblies, are each 5 feet long and enriched more than 90% with $U^{235}$. They are used as a first step in the enlargement of the active portion of the EBWR to a full 5 foot by 5 foot geometry which will be completed in a future loading of the reactor.

Since the new 5 foot spike assemblies 28 are to be used in conjunction with the four-foot plate type elements, it is required that they be reversible in the core to make maximum utilization of the fuel material therein. The spike assemblies 28 comprise a frame 32 (FIG. 3) into which a symmetrical fuel rod subassembly 34 (FIG. 4) is insertable. The fuel frame has a stainless steel locating tip end fitting 36 which is hollow and open at each end for the passage of coolant therethrough. The rounded lower end 36a of the end fitting 36 is adapted to fit into corresponding apertures 37 (FIG. 1) in the support grid 22 while the upper end 37a of the end fitting 36 is square in cross section to receive four corner braces 38 welded thereto. The upper ends of the corner braces are joined by flat plates 40 butt welded thereto. The flat plates 40 each have a pair of Inconel springs attached thereto; the lower springs are provided for positioning with regard to the four-foot fuel elements in the core and the upper ones are provided for positioning when the active portion contains all five-foot fuel assemblies. The corner braces 38 and the flat plates 40 are fabricated of Zircaloy-2 alloy. The frames 38 are 3¾ inches square, thus providing a total of ¼ inch distortion for each fuel assembly in two directions when positioned in the reactor.

Figure 5:
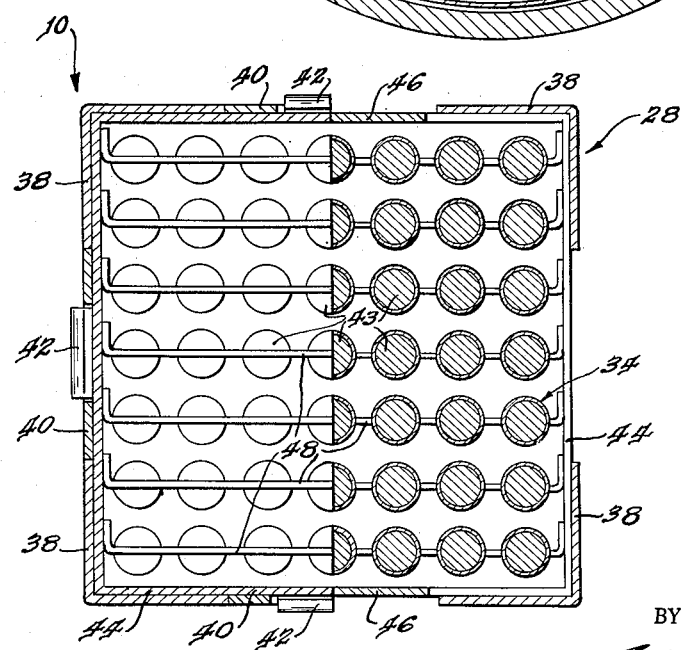
FIG. 5 is a horizontal partial section of the fuel assembly taken along the line 5—5 of FIG. 3.

The symmetrical fuel rod subassemblies 34 each comprise forty-nine fuel containing rods 43, extending between a pair of stainless steel end fittings 44 joined together by a pair of longitudinally-extending Zircaloy-2 side straps 46. Within each end fitting 44 are seven parallel straps 48 (FIG. 5) which are adapted to receive slotted end fittings at each end of the fuel-containing rods 43. The rods 43 are supported in the middle of the subassembly 34 by a Zircaloy-2 spacer grid 52. The fuel rods 43 each contain uranium, greater than 90% enriched, dispersed in an aluminum alloy matrix and having a diameter of .325 inch. Each rod is clad with a .025 inch Zircaloy-2 jacket to protect it from corrosion.

The symmetrical fuel rod assembly 34 is slidably insertable in the upper end of the frame 32. It may be inserted in either direction and the lower end fitting 44 is supported around its edge by the upper edge of the locating end fitting 36 of the frame.

*Reactor control*

Control of the reactor is effected by nine cross-type control rods 54 similar to those in original loading of the EBWR. Each of the nine rods has a 2% boron stainless steel absorber section 56 and a follower section 58 containing 200 grams of $U^{235}$ fuel which enhances the control capabilities of the rods. Each of the absorber sections 56 is ¼ inch thick, 10 inches wide and 58 inches long. The fuel follower sections 58 are each ¼ inch thick, 10 inches wide and 36.5 inches long. The control rods 54 are each operated by control drives (not shown) located beneath the reactor vessel in a manner similar to the original loading of the EBWR reactor described in the reference report ANL–5781.

The nine rods will have a combined strength of approximately 15% K. The total amount of K to be controlled is approximately 13% distributed as follows:

| | Percent |
|---|---|
| Operating voids (18.9% of coolant channels) | 4 |
| Temperature density effects from room temperature to operating temperature (489° F.), (approx.) | 1 |
| Xenon (at room temperature) | 2 |
| Burnup, approximately | 6 |

*Reactor cooling*

The Experimental Boiling Water Reactor with its new loading operates to cool its fuel assemblies by natural circulation currents of water upward through the fuel assemblies. In accordance with this invention, means have been provided to increase the flow of the coolant by natural circulation through the fuel assemblies.

The reactor vessel 14 contains water, 59, serving as a neutron moderator and coolant. The water surrounds the active portion 10 and fills the fuel assemblies in the spaces between the fuel-containing bodies. A cylindrical shroud 60 fabricated from ⅛ inch thick type-304 stainless steel surrounds the active portion 10 of the reactor and is secured at its bottom end to the lower grid support structure 22. The upper end of the shroud 60 extends above the upper end of the fuel assemblies 12 and terminates in a flange 62. A substantially cylindrical riser or chimney 64 is bolted to the flange 62 on the shroud 60 and is approximately eight feet long extending to a height approximately one foot below the level of the coolant water 59.

Subcooled feedwater is introduced into the pressure vessel 14 by means of an inlet pipe 66 and distribution ring 68 located adjacent the top end of the riser 64. The subcooled water as it enters through the distribution ring flows downward through the annulus or downcomer 70 between the shock-shield 16 and the bolted shroud 60 and riser 64.

The feedwater continues downward to the bottom of the pressure vessel 14 below the lower support grid 22 wherein it is distributed to each of the fuel assemblies 12. The nuclear reaction within the active portion 12 causes the water therein to be heated and thus rise because of its decreased density. As the water continues its flow upward through the fuel assemblies 12, it begins to boil and the steam and saturated water continue upward through the support guide 24 and the riser 64 to the top of the pressure vessel 14 where the steam disassociates from the saturated water and passes on through the baffle system 18 to the steam outlet 15.

The riser 64 produces a greater pressure head differential between the low density steam-water mixture leaving the active portion 10 and the water in the downcomer 70. The resulting increased recirculation permits a greater steam production rate for the same steam void fraction in the core. The latter is an important factor in reactor stability. The riser 64 has a conical portion 72 which serves to reduce the cross-section at its upper end to a circle having a diameter of approximately four feet. This area is thus approximately equal to the total flow area through all of the fuel elements 12 in the active portion 10. The conical reduction in the core effluent area effects a corresponding increase in downcomer volume at its upper end. With the increased volume, the velocity of the coolant flow in the upper portion of the downcomer is thus materially reduced which enhances the disengagement of steam from the recirculating water. With less steam mixed with the water in the downcomer, the density is greater with respect to the two-phase mixture in the coolant channels. An increase in the pressure head differential results leading to an increase in the flow rate in the active portion. The riser and shrouding approximately doubles the active portion recirculation flow rate over that attained in the old EBWR core loading. The recirculation flow rate is approximately $9.6 \times 10^6$ lbs./hour as compared to the measured value of $4 \times 10^6$ lbs./hour with the old loading operating at 60 megawatts. The riser and shrouding have a marked effect on the flow rate through all the fuel assemblies in the active portion, but they have a substantially greater effect on the coolant velocity in the outer peripheral fuel assemblies. The velocity instead of dropping off at the active portion periphery remains fairly constant even though the power density is substantially lower. This results from the fact that the outer fuel assemblies have lower steam volume fractions and hence less frictional resistance, but still share the high driving head of the common riser.

*Auxiliary reactor systems*

The remaining systems used in the operation of the Experimental Boiling Water Reactor such as the safety system and steam cycle system have not been materially altered from those used in the original loading as described in the report ANL–5781, and, hence, will not be described here in detail. The safety system is a standby type which operates to inject high-pressure boric acid through a perforated ring 74 (FIG. 1). The system is designed to reduce the reactor core reactivity below criticality if the control rods 54 fail to operate properly under shut-down conditions. The system has been altered to remove the automatic injection feature and to increase the volume of concentrated boric acid solution to handle more than 13% reactivity. Control of injection is still available to the reactor operator at all times. Eliminating the automatic injection feature is done on the basis that rapid boric acid insertion is not necessary, since it is a back-up measure only to be used after due consideration of conditions in the reactor. One other consideration for eliminating the automatic injection was that at equilibrium controlled operation insertion of one rod is sufficient to drop the void control reactivity and reduce the power.

The major components of the steam cycle system remain substantially as described in the previously mentioned report. It was necessary, however, to provide a by-pass system around the 20,000 kilowatt (heat) capacity turbine since the reactor heat output is now 100 megawatts. Provisions have been made to transfer 80 megawatts to the steam distribution system for laboratory buildings around the Experimental Boiling Water Reactor site. Air-cooled, steam condensing units and the necessary heat-exchangers for dissipating the additional thermal energy have been added to insure continuous operation of the reactor at maximum capability during summer months when steam demands are sharply reduced and to insure the availability of low temperature reactor feedwater for greater flexibility in the reactor operation. The additional units to the steam cycle system are all of conventional design and do not form a part of the invention; therefore, they are not described in detail in this specification.

The following table summarizes the major design and operating features of the Experimental Boiling Water Reactor facility as modified for 100 megawatt operation:

*Plant parameters*

General:
| | |
|---|---|
| Type | Direct cycle boiling reactor. |
| Heat output | 20,000 kw. for turbine; 80,000 kw. for heating. |
| Gross electrical output | 5,000 kw. |
| Operating pressure | 600 p.s.i.g. |
| Operating temp | 489° F. |
| Coolant | $H_2O$. |
| Moderator | $H_2O$. |
| Fuel | $U^{235}$, $U^{238}$, $Pu^{239}$ and $Pu^{241}$. |

Core:
| | |
|---|---|
| Active diameter | 5 ft. |
| Active height | 5 ft. |
| Total uranium content | 6.4 tons. |
| Total $U^{235}$ content | 65–90 kg. |
| Average water/uranium volume ratio | 3.64. |
| Structural material | Zircaloy-2 and Al. |

*Plant parameters*—Continued

Fuel assemblies:
- Total no. in core: 147 (≅ 20% of assemblies are spiked).
- Cross-sectional dimensions: 3.75 x 3.75 in.
- Number of plates per assembly: 6.
- Number of rods per spiked assembly: 49.
- Side plates: 0.060 in. thick Zircaloy-2.
- Cladding: 0.020 in. thick Zircaloy-2.
- End fittings: Stainless steel.
- Composition of fuel: 93.5% U, 5% Zr, 1.5% Nb (by weight).
- Composition of spikes: Zr, Al structure with $U^{235}$.
- Thickness of fuel in thin plates: 0.170 in.
- Thickness of fuel in thick plates: 0.233 in.
- Thickness of fuel in rods: 0.325 in. diameter.
- Width of water channels between thin plates: 0.428 in.
- Width of water channels between thick plates: 0.360 in.
- Power generation in average assembly: ≤ .68 M.W.

Nuclear data:
- Average thermal flux: $3 \times 10^{13}$.
- Neutron lifetime: $6 \times 10^{-5}$ sec.
- Reactivity to control: ~≤ 13%.
- 9 control rods with 8 fuel followers: ~15%.

Heat transfer and fluid flow:
- Average power density in core coolant: 108 kw./liter.
- Maximum power density in core coolant: 378 kw./liter.
- Steam flow (at 100 M.W.): 300,000 lb./hr.
- Average steam voids in heated channels: 18.9%.
- Average steam voids in total moderator: 16.5%.
- Average exit steam quality: 3.2%.
- Lb. of water circulated per lb. of steam: 32.
- Subcooling at core inlet: 12° F.
- Non-boiling height of core: 40% (av.).
- Average coolant inlet velocity: 6.3 ft./sec.
- Average heat flux: 138,000 B.t.u./hr.-ft.²
- Maximum heat flux: 485,000 B.t.u./hr.-ft.²
- Estimated burnout heat flux: >1,000,000 B.t.u./hr.-ft.²
- Maximum surface temperature: 514° F.
- Average fuel centerline temperature—
  - (a) Thick plate (enriched): 579° F.
  - (b) Thin plate enriched): 567° F.
  - (c) Rod (spike): 558° F.
- Maximum fuel centerline temperature—
  - (a) Thick plate (enriched): 767° F.
  - (b) Thin plate enriched): 724° F.
  - (c) Rod (spike): 694° F.

Control rods:
- Total number: 9.
- Spacing: 12.75 in. x 12.75 in.
- Shape: Cruciform, 10 in. x 10 in.
- Penetration of absorber into core: 60 in.
- 56″ travel time: 1.35 sec.
- Maximum withdrawal rate: 0.4 in./sec. ~ 0.01% k./sec.

Boron—stainless rods—
- Thickness: 0.250 in.
- Boron content: 2% by weight.
- Strength of 9 rods: ~15%.

Pressure vessel:
- Diameter, inside: 7 ft.
- Height: 23 ft.
- Working pressure: 600 p.s.i.g.
- Design pressure: 800 p.s.i.g.
- Thickness of cylindrical portion: 2⅜ in.
- Material: SA 212 Grade B boiler plate.
- Cladding: 0.1 in. Type 304 stainless steel.
- Thermal shield: 1 in. 18–8 stainless steel containing 1% Boron.
- Relief valve settings: 650, 700, 725, 750, and 775 p.s.i.g.
- Total weight: 60 tons.
- Weight of contained water: 14 tons.

Power plant:
- Condenser pressure: 2½ in. Hg abs.
- Flow rate to cooling tower: 13,650 g.p.m. max.
- Feedwater flow rate: 600 g.p.m.
- Feedwater temperature: 120° F.
- Generator output voltage: 4,160 volts.

Figure 6:
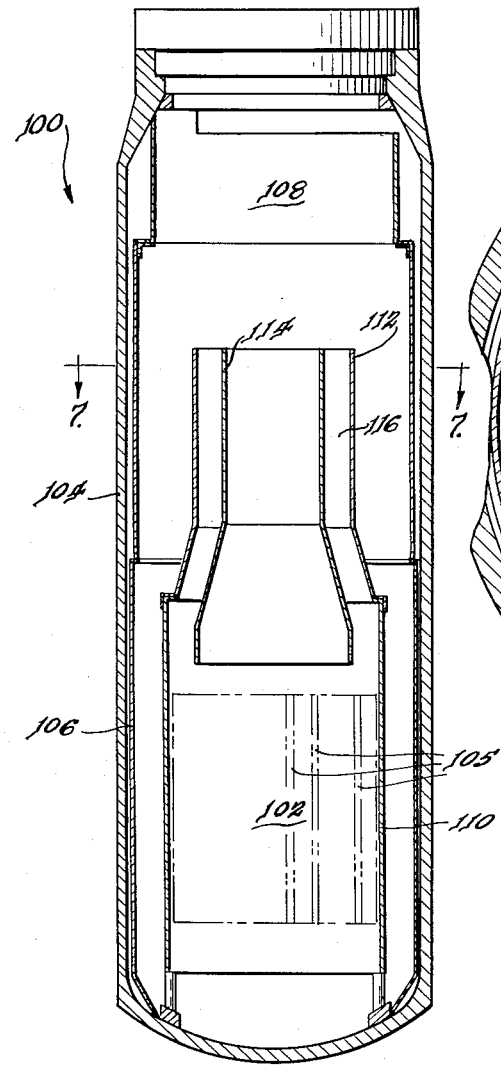
FIG. 6 is a vertical section of a natural circulation boiling water reactor having concentric large diameter risers in accordance with this invention.
Figure 7:
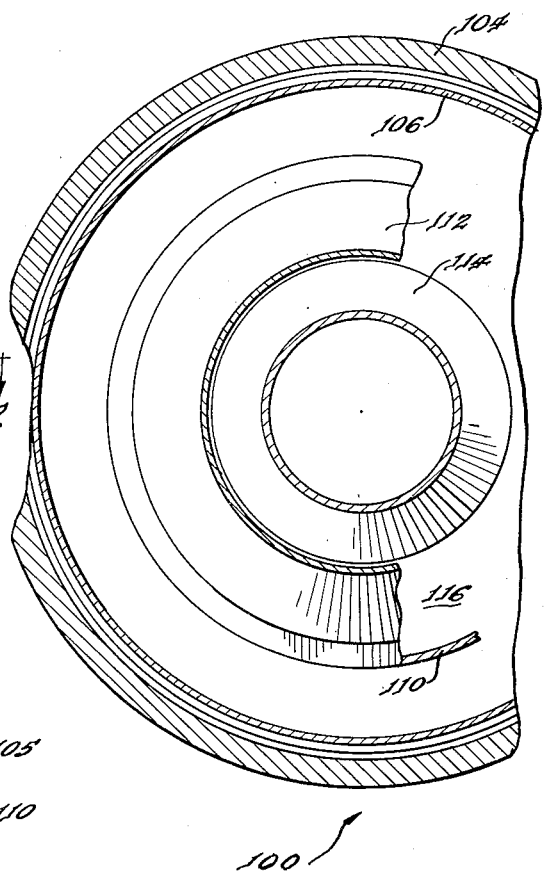
FIG. 7 is a horizontal section taken along the line 7—7 of FIG. 6.

Reference is now made to FIGS. 6 and 7 showing another feature of this invention wherein a plurality of risers above the active portion are used to not only increase the rate of natural circulation flow, but also to control the rate of flow through selected different portions of the reactor active portion. The boiling water reactor 100 is disposed within a pressure vessel 104 and comprises an active portion 102. The active portion has coolant channels 105 vertically extending therethrough. A shock-shield 106 lines the inside of the pressure vessel 104 and supports an appropriately designed steam baffle system 108 at its upper end. A cylindrical shroud 110 surrounds the active portion 102 and supports an outer riser 112 at its upper end. An inner riser 114 is disposed concentrically within the outer riser 112 and forms an annulus 116 therewith so that coolant fluid may pass through the interior of the inner riser 114 as well as the annulus 116. The coolant channels 105 are adapted to pass coolant from their upper ends into either the annulus 116 between the concentric risers or the interior of the inner riser 114.

The inner riser 114 is conically convergent in the direction of two-phase coolant flow so that the flow area at its exit end is approximately equal to the combined flow areas of all of the coolant channels communicating with its interior. The increased driving head caused by the extended length of the riser 114 will cause a substantial increase in the flow of coolant through the active portion 102 as hereinbefore described.

The outer riser 112 is adapted to reduce the coolant flow through the peripheral coolant channels. It, also, has a conically convergent portion which extends to a height whereat the flow area in the annulus 116 is substantially smaller than the combined flow areas of the communicating peripheral coolant channels. It is well known that the heat distribution in a radial direction in the active portion of a reactor approximates a cosine curve with substantially less energy generation in the outer periphery. Since less heat dissipation is required in this outer portion, the coolant flow rate need not be as great as in the central portion of the reactor. The reduced area annulus 116 is effective to choke the coolant flow therethrough by a predetermined amount in accordance with the heat removal desired in the active portion 102.

The downcomer 118 formed between the outer riser 112 and the shroud 110 with the shock-shield 106 has an advantageously increased flow area at its upper end due to the divergently shaped risers 114 and 116. The reduced coolant flow in the peripheral coolant channels and the annulus 116 combined with the increased flow area at the upper end of the downcomer 112 combine to substantially reduce the velocity of the coolant flow in the upper portion of the downcomer 112 combine to substantially reduce the velocity of the collant flow in the upper portion of the downcomer. Steam disassociation is materially increased resulting in a greater density disparity between the coolant in the downcomer and the coolant in the active portion. The flow rate through the central coolant channels is substantially increased, providing for a higher maximum permissible power output of the reactor.

Other modifications and embodiments will become apparent to a skilled artisan by reading this specification. It is therefore the inventor's intention to be bound only by the limitations contained in the appended claims.

What is claimed is:

1. A neutronic reactor comprising a pressure vessel, means defining a plurality of vertical channels disposed within the pressure vessel, a body of steam-forming liquid surrounding the channel-defining means within the pressure vessel, the lower ends of said channels communicating with the body of steam-forming liquid, a plurality of risers concentrically positioned above said channel-defining means forming annuli therebetween, each annulus associated with a preselected set of channels and communicating only therewith, each of said annuli adapted to have a different flow area and communicating at its upper end with said body of liquid, and means to establish a neutronic chain reaction within the pressure vessel of sufficient intensity to form steam within the channel-defining means and establish circulation upward through said channels and said risers and downward around said channel-defining means.

2. A neutronic reactor comprising a pressure vessel, a body of steam-forming liquid disposed within the pressure vessel, a plurality of fuel elements vertically disposed within the pressure vessel to form a cylindrical active portion, said fuel elements defining vertical channels directly communicating with the liquid in the pressure vessel at its lower ends, a first cylindrical riser above said active portion communicating with the centermost fuel elements in said active portion, a second riser positioned concentrically around said first riser and forming an annulus therewith, said annulus communicating with the outermost fuel elements and having a smaller flow area than said fuel elements, and means to establish a nuclear reaction within the pressure vessel of sufficient intensity to form steam within the channels and establish liquid circulation upward through the channels and riser and downward exterior to said active portion.

References Cited in the file of this patent

Nucleonics, vol. 3, No. 12, December 1955, p. 42.

Atomic Energy Commission Document, ANL-5720, Performance and Potential of Natural Circulation Boiling Reactors, Flinn et al., October 1957, 47 pages.